April 16, 1963     I. MASSMAN     3,085,281
NAIL POLISH CONTAINER, MIXER AND REMOVABLE APPLICATOR
Filed June 7, 1961
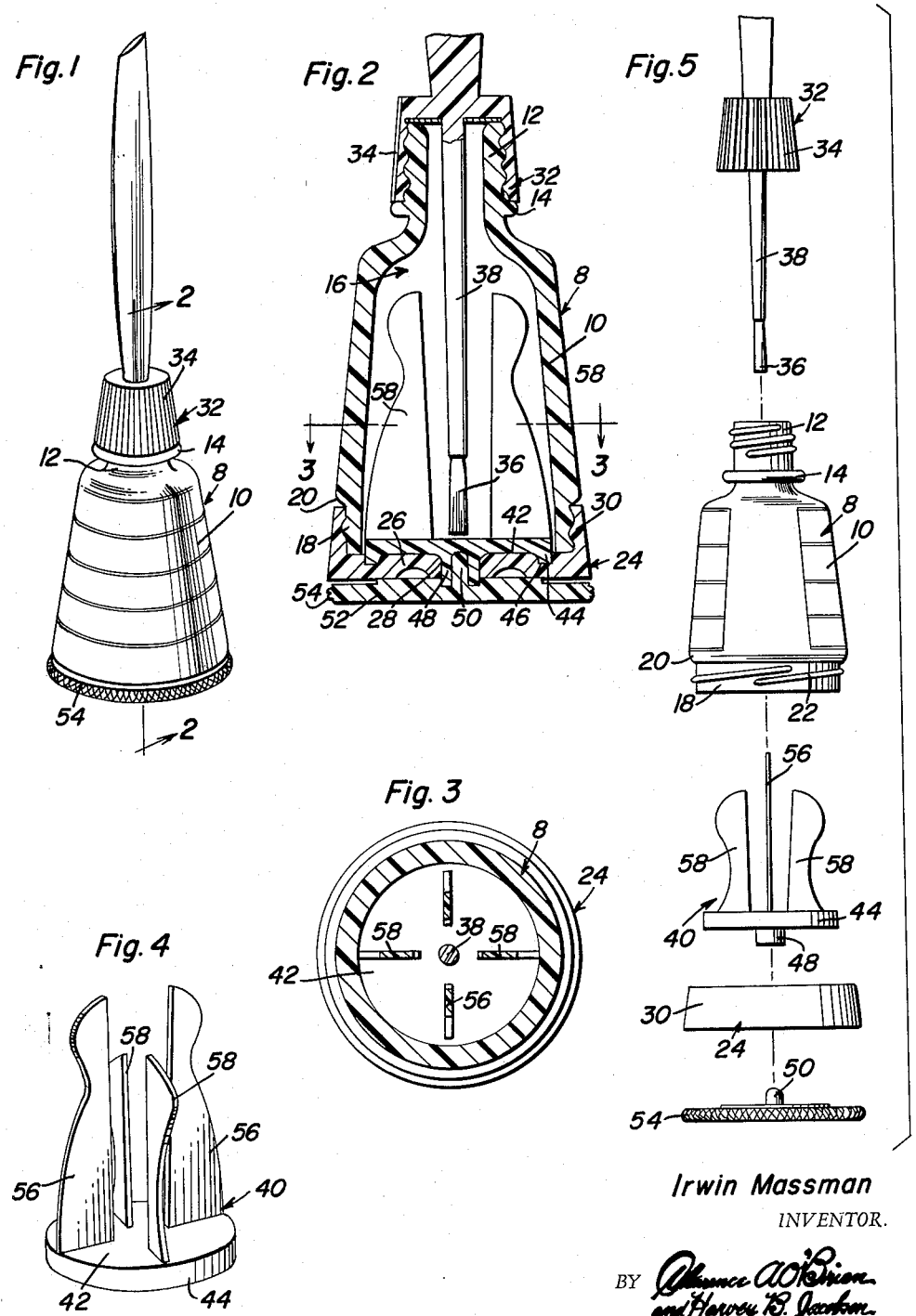
Irwin Massman
INVENTOR.

United States Patent Office 3,085,281
Patented Apr. 16, 1963

---

3,085,281
NAIL POLISH CONTAINER, MIXER AND
REMOVABLE APPLICATOR
Irwin Massman, P.O. Box 2732, Dallas 21, Tex.
Filed June 7, 1961, Ser. No. 115,568
4 Claims. (Cl. 15—510)

The present invention relates to certain new and useful improvements which have been effectively and satisfactorily incorporated in a nail polish container having an openable and closable upper end and a closing cap therefor, the latter being provided with a brush-type applicator which depends into the receptacle portion of the container.

More particularly the invention has to do with a container, mixer, applicator combination such as revealed in Patent 2,904,808, granted to me on September 22, 1959, and on which the present invention is an improvement.

With a view toward better categorizing the subject matter of the instant invention and in the belief that the aforementioned patent is indicative of the prior art most pertinent to the present invention brief reference to the stated patent will be undertaken here. To this end it will be noted that the prior patent is characterized by a container having an open top permitting access to be had to the receptacle portion of the container. A closing cap is screwed or otherwise removably fastened atop the container and is provided with an axial depending brush-type applicator. A tubular perforated shaft is operable vertically in the receptacle portion of the container and extends rotatably through the fixed or solid bottom of the container and paddles or agitating blades are mounted on and carried by the exterior of the shaft and function to stir and mix the contents of the container. This result is accomplished by the use of an operating wheel fixed on the lower end portion of the shaft below the bottom of the container and functioning, when manually turned to rotate the shaft.

In carrying out the present invention simplified mechanical mixing means is rotatably mounted in a screw cap which screws on the bottom of the container. Therefore, and with this improved construction the container, an open ended body, may be made of suitable material and provided with a screw-threaded neck at the upper end and a screw-threaded annulus at the bottom. The screw-threaded neck serves to accommodate a conventional type screw cap and applicator unit. The mixing device, which includes a cap-like screw-on bottom may, like the applicator unit, be fabricated entirely of plastic materials. Under these circumstances and using a decorative glass metal or plastic container, a colorful cap-equipped applicator, and a distinctively colored bottom with built-in agitator, an effective and an ingenious combination is provided.

Stated somewhat more explicitly and regardless of the screw cap and applicator combination, the screw-on bottom has a central bearing hole therein to accommodate an assembling and journaling stud on the central bottom of a circular base constituting a significant component of the internal agitating and stirring means.

Then, too, with the instant concept in mind the circular or disk-like base of the agitator means may be provided with a depending flange turnable in a groove in the screw-on bottom thus providing an effective sealing action and dispensing with O-rings revealed in the aforementioned Patent 2,904,808.

Furthermore, novelty is predicated on the construction and arrangement so far revealed and wherein the disk or base is provided with upstanding circumferentially spaced paddle-like stirring blades making it possible to dispense with the aforementioned tubular shaft, and providing for a simple manually turnable operating wheel for the agitating means.

Other objects, features and advantages will become more readily apparent from the following description and the accompanying illustrative, but not restrictive drawings.

In the drawing, wherein like numerals are employed to designate like parts throughout the views:

FIGURE 1 is a view in perspective of the nail polish container with the conventional-type cap-applicator and the improved agitating means constructed in accordance with the principles of the present invention;

FIGURE 2 is a view on an enlarged scale and with parts in section and elevation taken approximately on the plane of the vertical line 2—2 of FIGURE 1 looking in the direction of the arrows;

FIGURE 3 is a horizontal section on the line 3—3 of FIGURE 2;

FIGURE 4 is a view in perspective of the essential component of the aforementioned rotatable agitating means; and FIGURE 5 is an exploded view wherein all of the component parts appear in side elevation and in their cooperable relationship.

With reference first to FIGURE 5 the numeral 8 designates the distinctively shaped and finished glass or equivalent container. The body portion is denoted at 10, the reduced neck or open upper end portion at 12 and the shoulder or bead on the neck at 14. The receptacle portion (FIGURE 2) is denoted at 16. A point of distinction is the fact that the lower or bottom portion is open and reduced in thickness to define an annular rim or ring 18 and a shoulder 20. The rim is provided with suitable screw threads 22 to accommodate the screw-on cap-like bottom 24. This readily applicable and removable bottom 24 may be of metal but is preferably made of a suitable grade of commercial plastics. It comprises a bottom 26 having a central hole therein providing a bearing 28 and having an upstanding connecting and retaining flange 30 which is internally screw-threaded and removably threaded on the threads 22 of the attaching rim 18.

Before introducing the agitator means reference will be had to the plastic or equivalent cap-applicator unit which is denoted generally by the numeral 32 and comprises a screw cap 34 screwed on the neck 12 and an applicator brush 36 on the lower end of the dipper stem 38. Although this cap applicator is being shown for completeness it will be understood that the essence of the invention is in the glass or equivalent nail polish container 8 having the depending screw-threaded rim or ring 18 and the attachable and detachable bottom 24. More particularly novelty is predicated, as already suggested, on the rotatable stirrer or agitator means, this being designated as a unit by the numeral 40 in FIGURE 4 in particular.

With further reference to FIGURE 4 it will be noted that the stirrer or agitating means 40 is characterized by a circular or disk-like base 42 which is of a plan diameter approximately equal to the cross-section of the bottom portion of the receptacle part 16. This is brought out in FIGURE 2. The outer rim or peripheral edge has a depending lip or flange 44 which is fitted rotatably in a channel or groove 46 provided therefor in the top of the part 36. At the center of the underneath side there is a depending stud 48 which constitutes a journal and which is journaled for rotation in the aforementioned bearing hole 28. This journal is axially socketed to accommodate a telescoping stud 50 on the central upper side of the finger operated turning wheel 52. This wheel is of the diameter illustrated and the marginal edge is knurled or otherwise milled as at 54. The base 42 is also unique in that it is provided with four upstanding paddle-like vanes or blades which obviously function as stirrers.

These are circumferentially spaced at equal distances and one pair of blades 56 are located diametrically opposite to each other and are taller than the intervening shorter stirrer blades 58, the latter being diametrically opposite to one another. Any suitable positive connection between the studs 50 and 48 may be employed to provide a rotating connection between the manually actuatable operating wheel 52 and the enclosed agitator means 40. With the construction shown it will be clear that the wheel may, if desired, be operated with the palm of the hand while, of course, the closing cap means 32 is still in place.

By having omitted the tubular shaft of the aforementioned patent it will be evident that the applicator 36 and 38 need not be angled or otherwise manipulated in order to dip the brush into the agitated nail polish.

It is believed that a careful consideration of the specification and claims in conjunction with the views of the drawing will enable the reader to obtain a clear and comprehensive understanding of the component parts and the manner in which they are assembled, disassembled or otherwise handled. Therefore, a more extended description is believed to be unnecessary.

Minor changes in shape, size, materials (such as glass, metal or plastic materials) and rearrangement of component parts may be resorted to in actual practice without departing from the spirit of the invention or the scope of the invention as claimed.

What is claimed as new is as follows:

1. In combination, a container for reception and confinement of nail polish or the like comprising a hollow body portion having an open neck at its upper end designed and adapted to accommodate an attachable and detachable closure, provided with an open bottom encompassed by a depending rim, an applicable and removable closure for said bottom having an exposed marginal attaching flange detachably surrounding said rim and also centrally provided with a hole constituting a bearing, agitator means confined for operation in the receptacle portion of said container, said agitator means embodying a component part which is parallel with and has a marginal edge portion in rotatable but in fluid-tight contact with an upper coacting surface of said bottom, said agitator means also having a depending axially disposed journal which is journaled for rotation in said bearing, also having flat-faced upstanding vanes circumferentially spaced and providing material stirring and mixing blades, and a hand wheel disposed exteriorly of and paralleling said bottom, centrally connected with and for turning the journal and of a diameter corresponding with the diameter of said bottom.

2. In combination, a container for nail polish or the like embodying a hollow body portion open at its respective top and bottom ends, a first readily applicable and removable closure for the top end having an axially disposed applicator depending into the receptacle portion of said container, a second closure for said bottom removably mounted on the bottom end of said body portion, agitator means embodying a circular base confined for rotatable operation in said receptacle portion, said base having liquid-tight rotatable contact with the coacting top surface of said bottom closure, the latter being provided with a bearing and said base being provided on an underneath side thereof with a centrally disposed journal, said journal mounted for rotation in said bearing, said base being provided on an upper side thereof with upstanding circumferentially spaced flat-faced paddles constituting stirring blades, and manually grippable and turnable operating means for the agitator means disposed exteriorly and availably against said bottom closure and centrally and operatively connected with said journal.

3. In combination, a container having a hollow body portion, an upper reduced screw-threaded neck to accommodate an applicable and removable closing cap, said body portion being open and reduced in cross-section to provide a shoulder and a depending annular rim, said rim being externally screw-threaded, a screw-on bottom having a central bearing hole and a marginal upstanding flange, said flange being screw-threaded and screwed on the threads of said rim, agitating means comprising a rotatable base superimposed on the interior of the closure and having a depending flange rotatable in a groove provided therefor in the interiorly disposed closure also having a central depending stud rotatable in said bearing hole and constituting a journal, and provided on an upper side with upstanding circumferentially spaced agitating blades, and a hand-turned operating wheel disposed exteriorly against the underneath side of the closure and having a central stud connected to said journal and serving to rotate the agitator means.

4. In combination, a container for nail polish comprising a hollow body portion open at top and bottom ends thereof, a readily applicable and removable closure for said top ends, said closure having an applicator depending into the receptacle portion of said container, an independent closure for the bottom and removably mounted on said bottom end and provided at a top surface thereof with an endless groove, agitating means embodying a base superimposed upon the interior of the bottom closure and provided with a depending marginal flange rotatable in said groove, also having a central depending stud rotatable in a bearing hole provided therefor at the central portion of said bottom closure, said rotatable base being provided on an upper side thereof with upstanding circumferentially spaced vanes having flat sides and constituting agitating blades and confined for operation in said receptacle portion and having inner vertical edge portions surrounding and spaced from the aforementioned depending applicator, and a hand-turned operating wheel disposed exteriorly against and beneath the underside of said bottom closure and having operating connection with said depending stud.

References Cited in the file of this patent

UNITED STATES PATENTS

| | | |
|---|---|---|
| 219,854 | Folsom | Sept. 23, 1879 |
| 937,995 | Hitt | Oct. 26, 1909 |
| 2,904,808 | Massman | Sept. 22, 1959 |